United States Patent
Yao et al.

(10) Patent No.: US 7,221,542 B2
(45) Date of Patent: May 22, 2007

(54) SYSTEM AND METHOD FOR HARD DRIVE DAMAGE PREVENTION BY PROVIDING REINFORCING MATERIAL TO CORNERS OF A MICRO-ACTUATOR TO IMPROVING THE SHOCK RESISTANCE THEREOF

(75) Inventors: Ming Gao Yao, Dongguan (CN); Masashi Shiraishi, Kowloon (HK)

(73) Assignee: SAE Magnetics (H. K.) Ltd., Shatin, N.T. (HK)

(*) Notice: Subject to any disclaimer, the term of this patent is extended or adjusted under 35 U.S.C. 154(b) by 0 days.

(21) Appl. No.: 10/966,687

(22) Filed: Oct. 14, 2004

(65) Prior Publication Data

US 2005/0052786 A1    Mar. 10, 2005

Related U.S. Application Data

(62) Division of application No. 10/206,244, filed on Jul. 26, 2002.

(30) Foreign Application Priority Data

Feb. 5, 2002    (WO)    .................... PCT/CN02/00058

(51) Int. Cl.
*G11B 5/56* (2006.01)
(52) U.S. Cl. .................................. 360/294.3; 360/294.4
(58) Field of Classification Search ............ 360/294.3, 360/294.4, 236.3, 274
See application file for complete search history.

(56) References Cited

U.S. PATENT DOCUMENTS 6,639,761 B1 * 10/2003 Boutaghou et al. ...... 360/294.1
6,731,464 B2 * 5/2004 Sasaki et al. ............ 360/236.3

* cited by examiner

*Primary Examiner*—A. J. Heinz
(74) *Attorney, Agent, or Firm*—Kenyon & Kenyon LLP

(57) ABSTRACT

A system and method are disclosed for hard drive damage prevention by improving the shock resistance of a hard disk micro-actuator. The interior angles of the micro-actuator are rounded and structurally supported by a reinforcing material.

10 Claims, 9 Drawing Sheets

Pin used for epoxy application

Micro-Actuator

HGA with 'U'-shaped micro-actuator

'Printing' method for reinforcing rounded corner

SYSTEM AND METHOD FOR HARD DRIVE DAMAGE PREVENTION BY PROVIDING REINFORCING MATERIAL TO CORNERS OF A MICRO-ACTUATOR TO IMPROVING THE SHOCK RESISTANCE THEREOF

RELATED APPLICATION

This application is a Divisional of patent application Ser. No. 10/206,244, filed on Jul. 26, 2002.

BACKGROUND INFORMATION

The present invention relates to magnetic hard disk drives. More specifically, the present invention relates to a system for damage prevention by improving the shock resistance of a hard disk micro-actuator.

Figure 1:
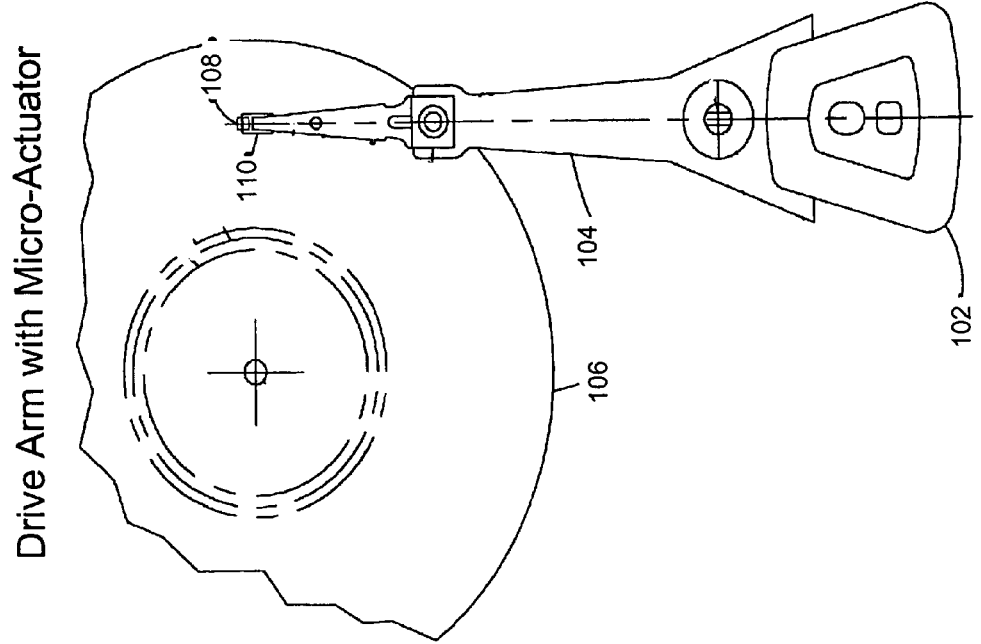

In the art today, different methods are utilized to improve recording density of hard disk drives. FIG. 1 provides an illustration of a typical drive arm configured to read from and write to a magnetic hard disk. Typically, voice-coil motors (VCM) 102 are used for controlling a hard drive's arm 104 motion across a magnetic hard disk 106. Because of the inherent tolerance (dynamic play) that exists in the placement of a recording head 108 by a VCM 102 alone, micro-actuators 110 are now being utilized to 'fine-tune' head 108 placement, as is described in U.S. Pat. No. 6,198,606. A VCM 102 is utilized for course adjustment and the micro-actuator then corrects the placement on a much smaller scale to compensate for the VCM's 102 (with the arm 104) tolerance. This enables a smaller recordable track width, increasing the 'tracks per inch' (TPI) value of the hard drive (increased drive density).

Figure 2:
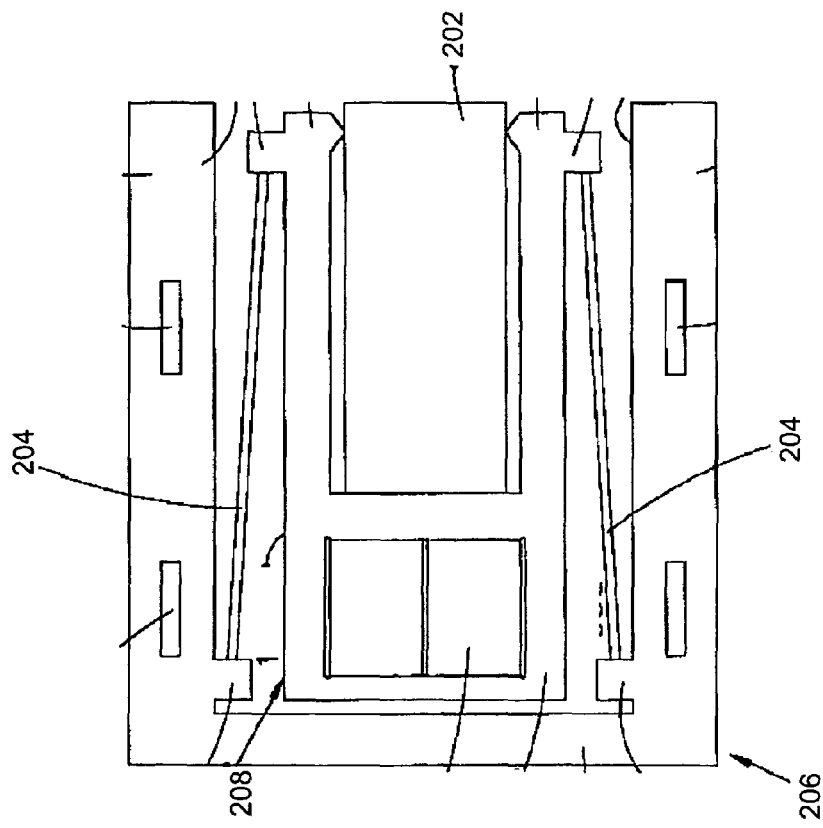

FIG. 2 provides an illustration of a micro-actuator as used in the art. Typically, a slider 202 (containing a read/write magnetic head; not shown) is utilized for maintaining a prescribed flying height above the disk surface 106 (See FIG. 1). Micro-actuators may have flexible beams 204 connecting a support device 206 to a slider containment unit 208 enabling slider 202 motion independent of the drive arm 104 (See FIG. 1). An electromagnetic assembly or an electromagnetic/ferromagnetic assembly (not shown) may be utilized to provide minute adjustments in orientation/location of the slider/head 202 with respect to the arm 104 (See FIG. 1).

As explained later, because of the small size scale, the relatively large forces interacting, and the use of brittle materials in the manufacture of micro-actuators, breakage and failure due to shock exposure of micro-actuators is a large concern. It is therefore desirable to have a system for improving the shock resistance of a hard disk micro-actuator.

BRIEF DESCRIPTIONS OF THE DRAWINGS

FIG. 1 provides an illustration of a drive arm configured to read from and write to a magnetic hard disk as used in the art.

FIG. 2 provides an illustration of a micro-actuator as used in the art.

Figure 3:
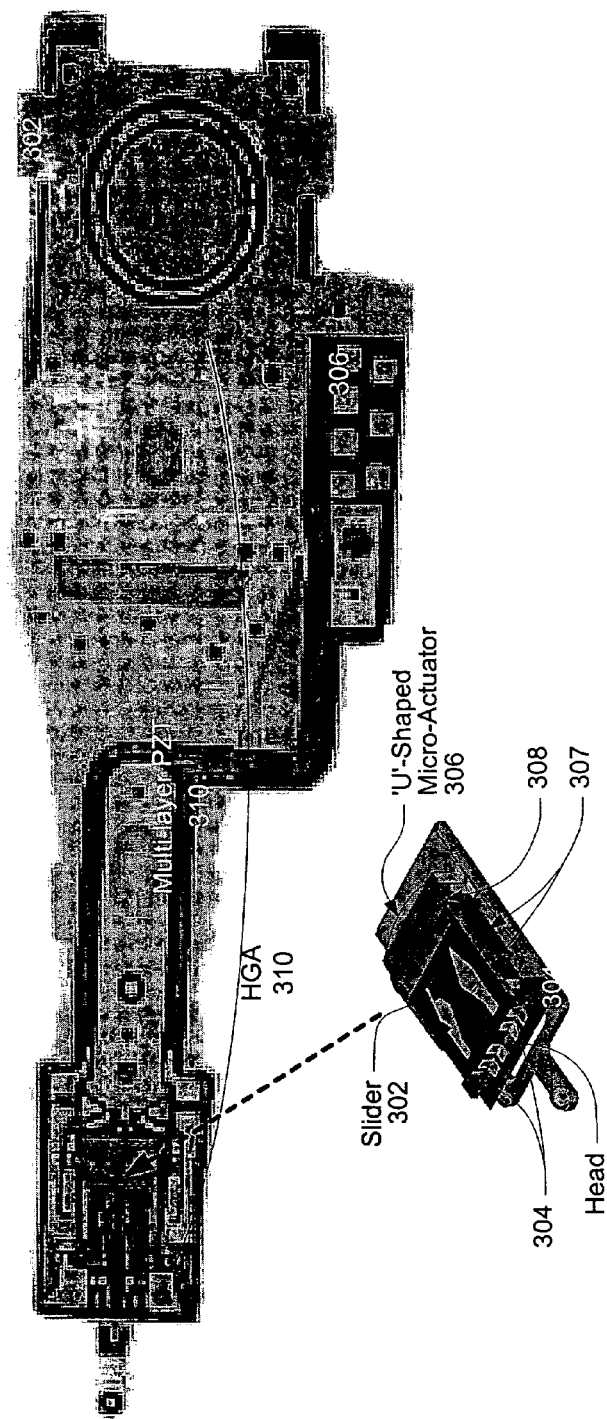

FIG. 3 describes a hard disk drive head-gimbal assembly (HGA) with a 'U'-shaped micro-actuator.

Figure 4:
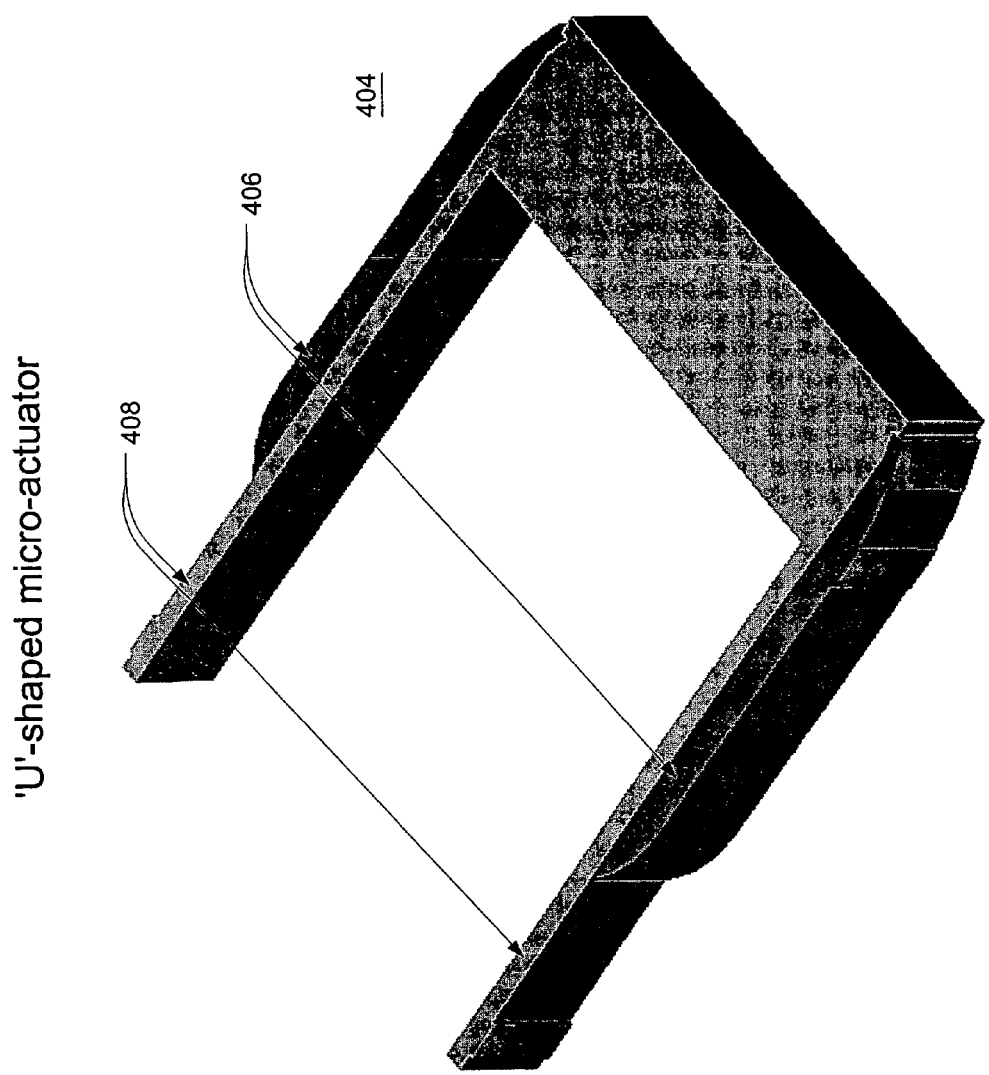

FIG. 4 provides an illustration of a 'U'-shaped micro-actuator.

Figure 5:
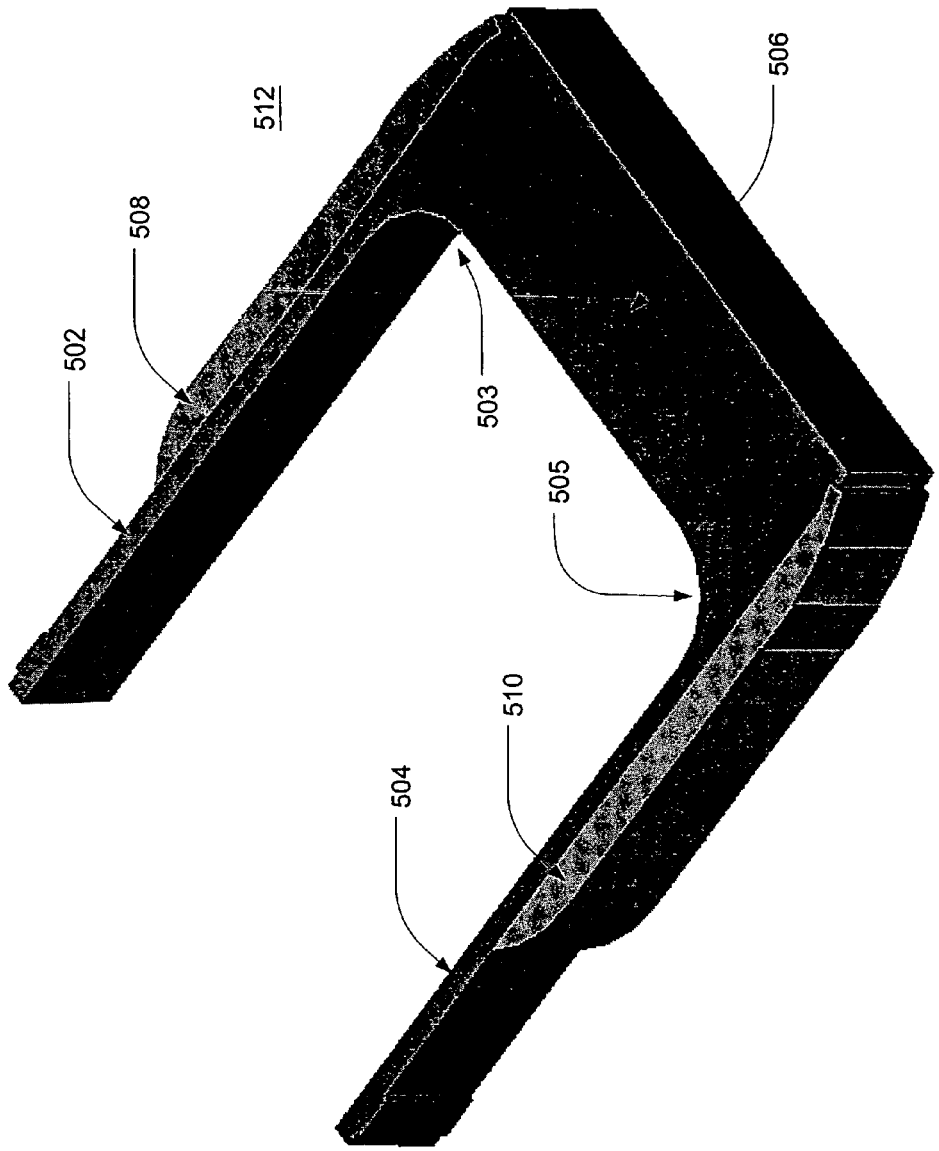

FIG. 5 provides an illustration of a 'U'-shaped micro-actuator with reinforcing rounded corners according to principles of the present invention.

Figure 6:
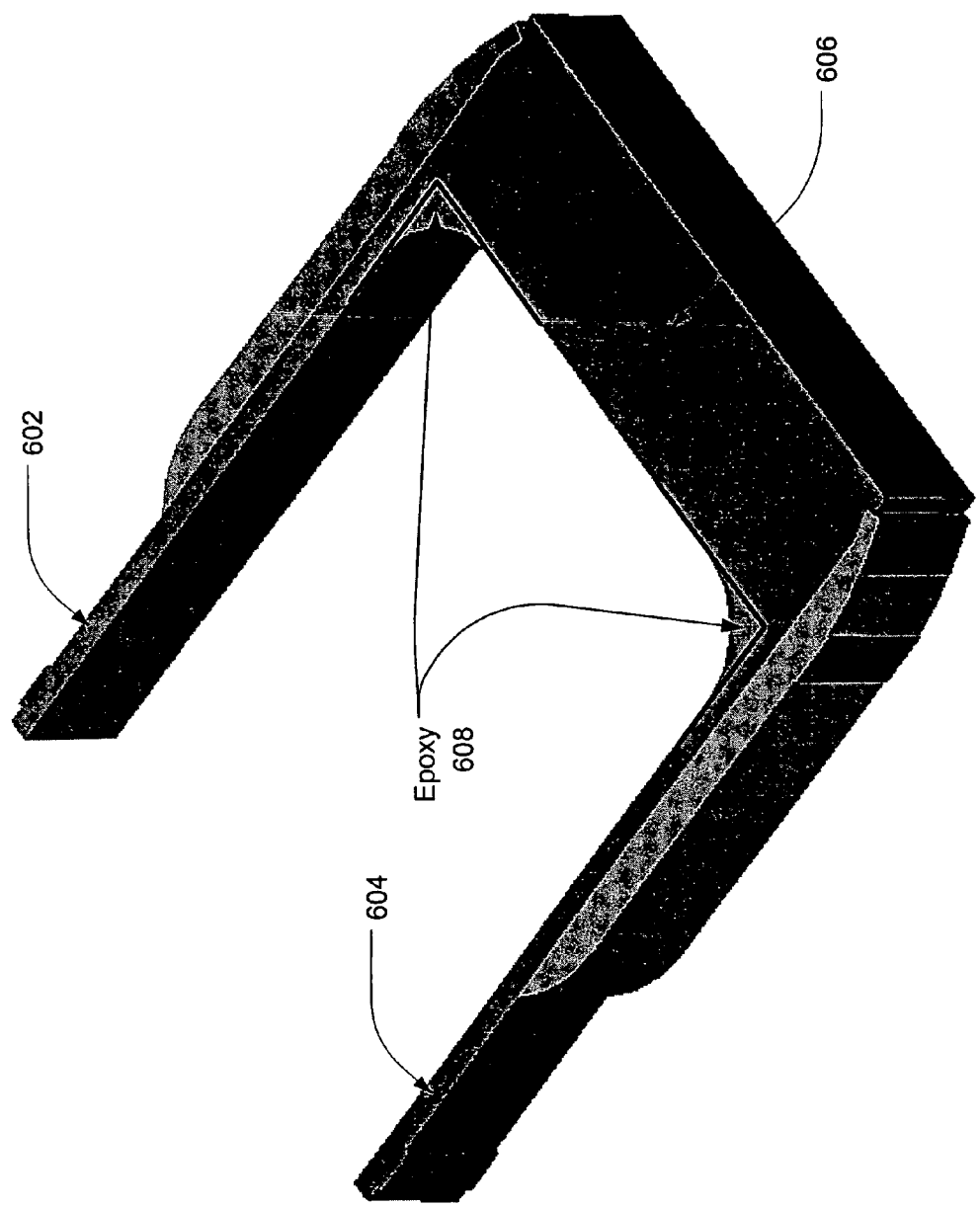

FIG. 6 provides an illustration of a 'U'-shaped micro-actuator with epoxy used for reinforcing the angle interiors according to principles of the present invention.

Figure 7:
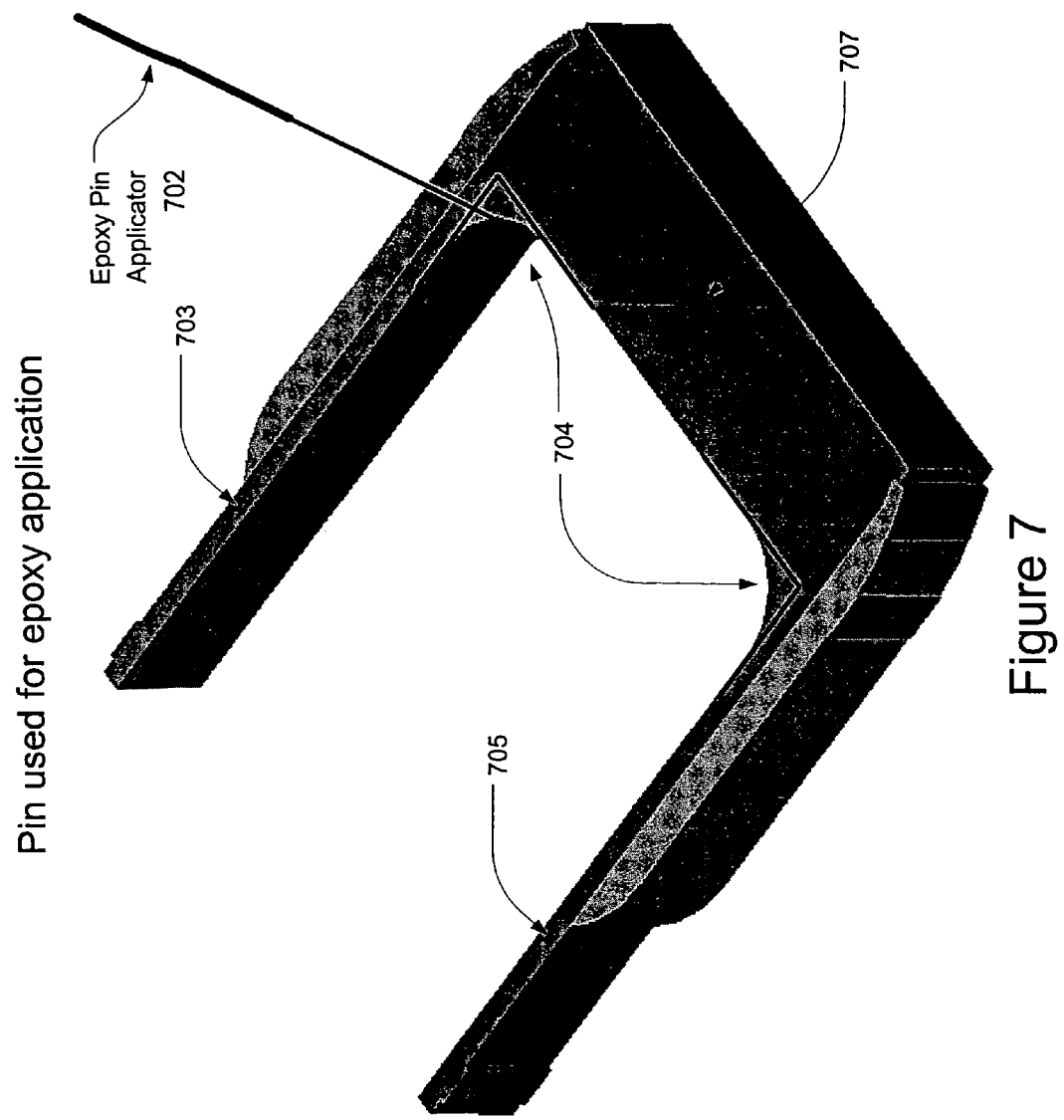

FIG. 7 provides an illustration of a 'U'-shaped micro-actuator with reinforcing material being applied by a pin applicator according to principles of the present invention.

Figure 8:
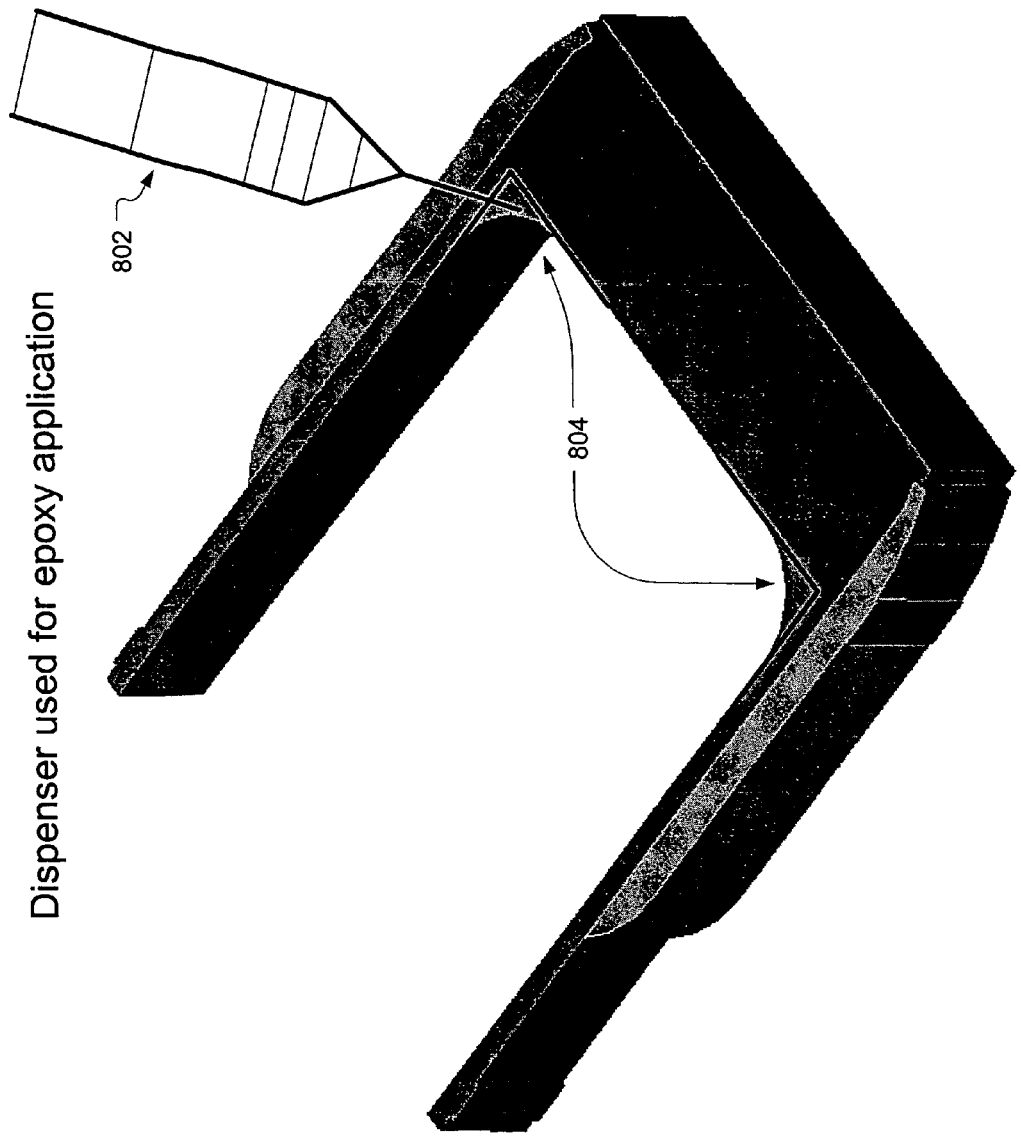

FIG. 8 provides an illustration of a 'U'-shaped micro-actuator with reinforcing material being applied by a 'syringe'-type dispenser according to principles of the present invention.

Figure 9:
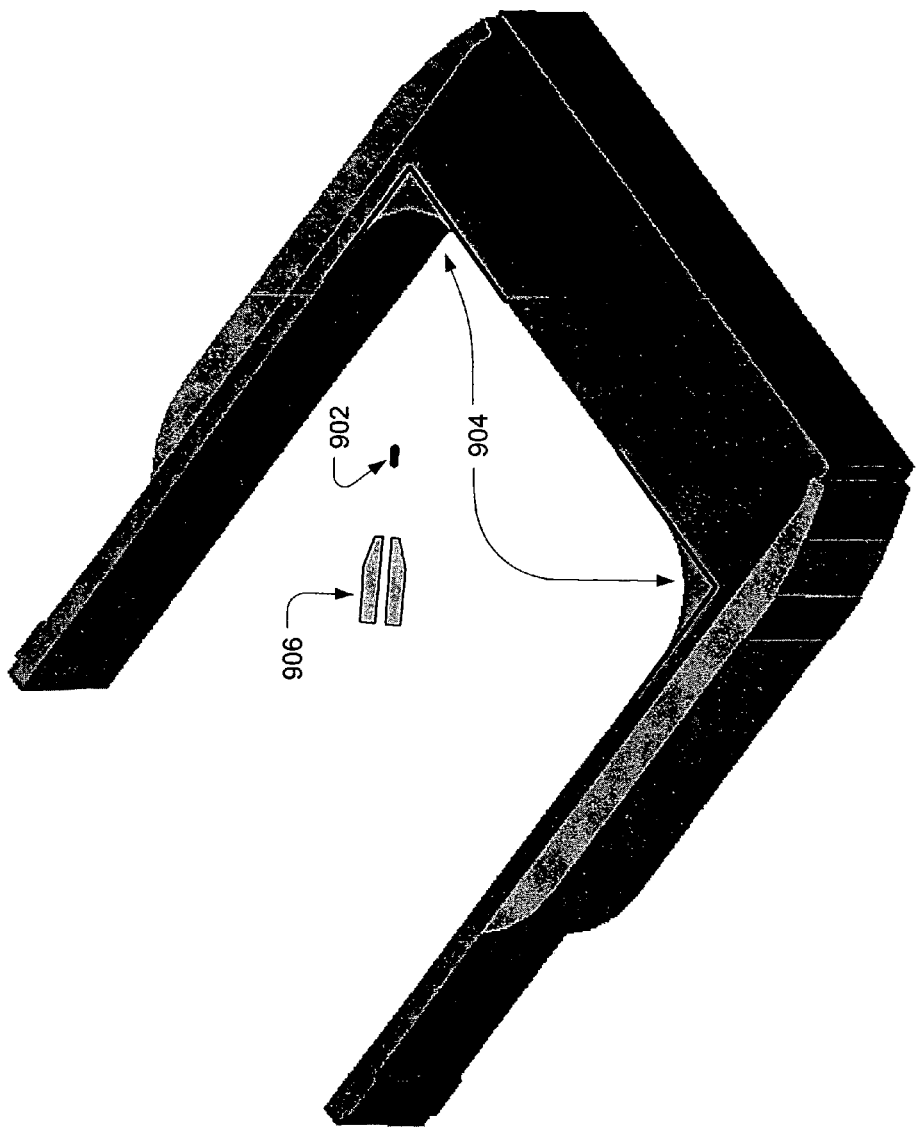

FIG. 9 provides an illustration of a 'U'-shaped micro-actuator that is reinforced by a method of spraying material into the interior corners.

DETAILED DESCRIPTION

For explanation purposes, this system and method for improving actuator shock resistance is described with respect to a 'U'-shaped micro-actuator. It will be appreciated that this is only one embodiment, and that other embodiments are possible.

Illustrated in an upside-down orientation, FIG. 3 describes a hard disk drive head-gimbal assembly 310 (HGA) with a 'U'-shaped micro-actuator. A slider (with read/write head) 302 is bonded at two points-304 to a 'U'-shaped micro-actuator 306. Further, the 'U'-shaped micro-actuator has a piezoelectric PZT (Piezoelectric Transducer) beam (arm) 307 on each side of a Zirconia support frame (actuator base/bottom arm) 308.

FIG. 4 provides an illustration of a 'U'-shaped micro-actuator 404. PZT material has an anisotropic structure whereby the charge separation between the positive and negative ions provides for electric dipole behavior. When a potential is applied across a poled piezoelectric material, Weiss domains increase their alignment proportional to the voltage, resulting in structural deformation (i.e. regional expansion/contraction) of the PZT material. The PZT structures 406 bend (in unison), the Zirconia arms 408, which are bonded to the PZT structures 406 bend also, causing the head/slider (not shown) to adjust its position in relation to the micro-actuator 404 (for magnetic head fine adjustments).

FIG. 5 provides an illustration of a 'U'-shaped micro-actuator with reinforcing rounded corners according to principles of the present invention. In one embodiment, as explained above, the interior 503 of the angle formed by the first arm 502 with the actuator base 506 and the interior 505 of the angle formed by the second arm 504 with the actuator base 506 are each rounded to reinforce the micro-actuator structure. Because the Zirconia structures 502,504,506 and the PZT structures 508,510 are brittle, the shock performance of the micro-actuator 512 without reinforcement is very poor. Without the rounded corners 503,505, a stress concentration point is formed at the sharp interior angle between arm and actuator base. (See FIG. 4). With the rounded corners 503,505 the stress concentrator is spread out in area and thus, is reduced. Further, the rounded corners 503,505 provide additional reinforcing material to support the arms 502,504. Also, in an embodiment, the rounded corners are provided by applying reinforcing material into the angle interiors, and the reinforcing material is softer than the micro-actuator material. The reinforcing material is thus more resilient to impact shock.

FIG. 6 provides an illustration of a 'U'-shaped micro-actuator with epoxy 608 used for reinforcing the angle interiors according to principles of the present invention. In an embodiment, epoxy 608 is applied to the interior of the angles formed between arm 602,604 and actuator base 606. As explained above, the epoxy 608 reinforces the arms 602,604 and structurally supports them to prevent impact shock damage or failure.

FIG. 7 provides an illustration of a 'U'-shaped micro-actuator with reinforcing material 704 being applied by a pin applicator 702 according to principles of the present invention. In an embodiment, a reinforcing material, such as epoxy, resin, gold, or platinum, is applied to the interior of the angles formed between arm 703,705 and actuator base 707.

FIG. 8 provides an illustration of a 'U'-shaped microactuator with reinforcing material being applied by a 'syringe'-type dispenser 802 according to principles of the present invention. In an embodiment, a reinforcing material is applied to the interior 804 of the angles by the dispenser 802 to reinforce the micro-actuator.

FIG. 9 provides an illustration of a 'U'-shaped microactuator that is reinforced by a method of spraying material into the interior corners. In one embodiment of the present invention, similar to the manner in which a computer inkjet printer applies ink to a sheet of paper, tiny droplets 902 of reinforcing material are sprayed into the interior of the corners 904. In one embodiment, this is done after a mask (not shown) is affixed to prevent overspray. The reinforcing material is sprayed by an automated spray nozzle 906 until the interior corners 904 of the micro-actuator are rounded to an appropriate amount.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A method to improve shock resistance of an actuator element comprising:

providing an actuator element having a generally 'U'-shaped structure, the 'U'-shaped structure being formed by at least a first arm joined at one end to an actuator base and a second arm joined at one end to said actuator base, said first arm and said actuator base forming a first angle and said second arm and said actuator base forming a second angle;

adapting said actuator element to be coupled to a slider element; and applying a reinforcing material to the interior of at least one of said first angle and said second angle to form a rounded corner and structurally strengthen said actuator element.

2. The method of claim 1, wherein the actuator element is a micro-actuator.

3. The method of claim 2, wherein the actuator element is a piezoelectric micro-actuator and the slider element is a side step slider.

4. The method of claim 1, wherein the reinforcing material is softer than the actuator element.

5. The method of claim 4, wherein the reinforcing material is resin.

6. The method of claim 4, wherein the reinforcing material is epoxy.

7. The method of claim 4, wherein the reinforcing material is gold.

8. The method of claim 4, wherein the reinforcing material is applied by a pin applicator.

9. The method of claim 4, wherein the reinforcing material is applied by a syringe-type dispenser.

10. The method of claim 4, wherein the reinforcing material is applied by a spray printing process.

* * * * *